United States Patent
Schlueter, Jr. et al.

(10) Patent No.: US 6,287,498 B1
(45) Date of Patent: Sep. 11, 2001

(54) PROCESS OF MAKING FLEXIBLE BELTS BY PULTRUSION

(75) Inventors: Edward L. Schlueter, Jr., Rochester; William E. Bond, Pittsford, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/465,208

(22) Filed: Dec. 15, 1999

(51) Int. Cl.$^7$ .............................. B29C 70/30; B29D 29/00
(52) U.S. Cl. ................... 264/137; 156/175; 264/171.24; 427/385.5; 427/387; 427/393.5; 427/434.6
(58) Field of Search ................... 264/103, 137, 264/171.24; 156/173, 175; 427/385.5, 387, 393.5, 434.6

(56) References Cited

U.S. PATENT DOCUMENTS

| | | | |
|---|---|---|---|
| 3,773,394 | * 11/1973 | Grawey | 152/185.1 |
| 4,921,557 | * 5/1990 | Nakamura | 156/169 |
| 5,122,417 | * 6/1992 | Murakami et al. | 428/371 |
| 5,763,125 | 6/1998 | Kawata | 430/58 |
| 6,106,944 | * 8/2000 | Heikkila et al. | 428/397 |
| 6,217,964 | * 4/2001 | Ndebi et al. | 428/36.91 |

FOREIGN PATENT DOCUMENTS 0 933 688 A2   8/1999   (EP) .

OTHER PUBLICATIONS

Fibreforce, Replacing Metals Where It Matters: "The Pultrusion Process," http://www.fibreforce.u–net.com/process.html (undated).
Fibreforce, Replacing Metals Where It Matters: "Pullwinding," http://www.fibreforce.u–net.com/pullwind.html (undated).
Brochures by KaZak Composites Incorporated (undated).
Brochures by Polygon, "Living with Composites Technology" (undated).

\* cited by examiner

*Primary Examiner*—Leo B. Tentoni
(74) *Attorney, Agent, or Firm*—John M. Kelly; David E. Henn

(57) ABSTRACT

A method of manufacturing flexible belts from fibers. Fibers that form the flexible belt are soaked with a liquid elastomer. The liquid elastomer soaked fibers are formed into the shape of a belt, beneficially by wrapping the fibers around a mandrel. The belt-shaped and soaked fibers are then cured. Multiple layer flexible belts can be formed by soaking fibers with a first liquid elastomer, wrapping those fibers around a mandrel, and then curing the mandrel to form a belt layer. Then, fibers are soaked with a second liquid elastomers. Those soaked fibers are then wrapped around the mandrel/belt layer. The fibers soaked with the second elastomer are then cured, forming a belt having two layers. The formed belt is then removed from the mandrel. The fibers and liquid elastomer(s) are beneficially chosen to introduce desirable belt properties.

7 Claims, 5 Drawing Sheets

FIG. 6
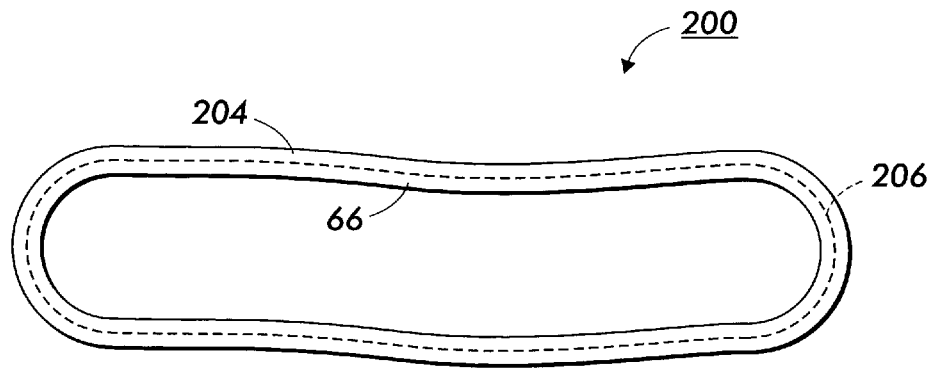
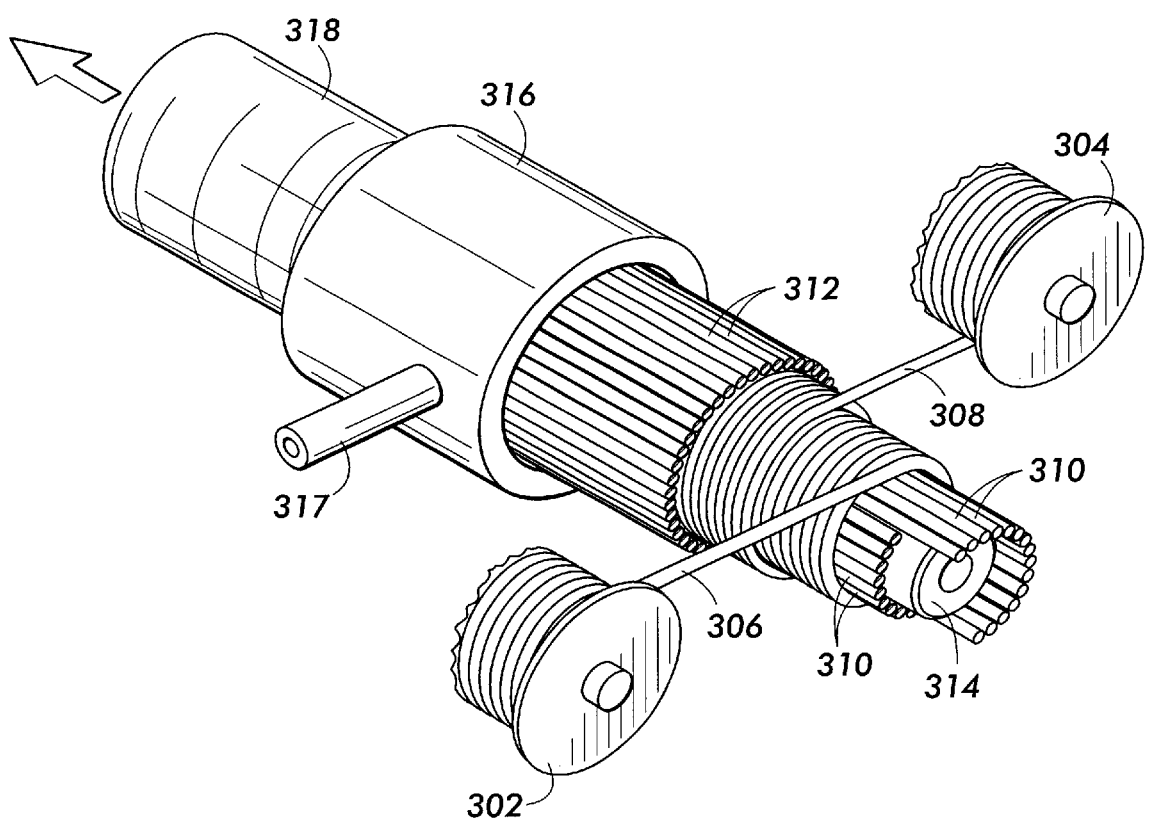
FIG. 7

PROCESS OF MAKING FLEXIBLE BELTS BY PULTRUSION

FIELD OF THE INVENTION

This invention relates to flexible belts. More particularly it relates to flexible belts fabricated from fibers that are coated with one or more liquid elastomers.

BACKGROUND OF THE INVENTION

Electrophotographic printing is a well known and commonly used method of copying or printing original documents. Electrophotographic printing is performed by exposing a light image representation of a desired document onto a substantially uniformly charged photoreceptor. In response to that light image the photoreceptor discharges, creating an electrostatic latent image of the desired document on the photoreceptor's surface. Toner particles are then deposited onto the latent image to form a toner image. That toner image is then transferred from the photoreceptor onto a receiving substrate such as a sheet of paper. The transferred toner image is then fused to the receiving substrate. The surface of the photoreceptor is then cleaned of residual developing material and recharged in preparation for the production of another image.

Many electrophotographic printers use flexible belts. For example, exposure is often performed on flexible belt photoreceptors, transfer often involves the use of flexible transfer belts, and fusing is often performed using flexible fusing belts. Flexible belts are of two types, seamed or seamless. Seamed belts are fabricated by fastening two ends of a web material together, such as by sewing, wiring, stapling, or gluing. Seamless belts are typically manufactured using relatively complex processes that produce a continuous, endless layer. In general, seamless belts are usually much more expensive (5–7X) than comparable seamed belts. While seamed belts are relatively low in cost, the seam introduces a "bump" that can interfere with the electrical and mechanical operations of the belt. For example, if a seamed belt is a photoreceptor the seam can interfere with the exposure and toner deposition processes, resulting in a degraded final image. While it is possible to synchronize the printer's operation such that the seam area is not exposed, such synchronization adds to the printer's expense and complexity. Additionally, even with synchronization the mechanical problems related to the seam bump, such as excessive cleaner brush wear and mechanical vibrations, still exist. Therefore low cost seamless belts have significant advantages over seamed belts.

Electrophotographic printing belts, whether seamless or seamed, are usually comprised of multiple layers, with each layer introducing a useful property. For example, one layer might provide the majority of a belt's mechanical strength, another might introduce an imaging layer, and another might improve a belt's toner release properties, while yet another might improve thermal properties. Because multiple layers should be mutually compatible, and since such compatibility significantly limits that range of acceptable materials, manufacturing multiple layer electrophotographic printing belts is particularly challenging.

Therefore, given the difficulty of manufacturing seamless flexible belts and of manufacturing multiple layer flexible belts, new manufacturing processes for such flexible belts would be beneficial.

SUMMARY OF THE INVENTION

The principles of the present invention provide for a new method of manufacturing flexible belts. Flexible belts according to the principles of the present invention are formed from fibers that are soaked with a liquid elastomer using a modified pultrusion process. Those fibers are then fabricated to form a flexible belt. Beneficially, multiple layer flexible belts can be formed by selectively pultruding fibers through a first liquid elastomer and then through a second liquid elastomer.

If a flexible belt is being fabricated using fibers soaked in only one liquid elastomer, the fibers are first soaked with that elastomer. The elastomer-soaked fibers are then wound around a core. The wound core is then passed through a forming die that smoothes the elastomer-soaked fibers into the shape of a belt. The liquid elastomer is then cured and the resulting fiber-reinforced elastomer is removed from the core, producing a flexible belt.

If a multiple layer flexible belt is being fabricated a first layer is formed by soaking fibers in a first elastomer, winding those soaked fibers around a core, passing the wound core through a die to smooth the first elastomer-soaked fibers into the shape of a belt, and then curing the first liquid elastomer. After the first layer is formed, a second belt layer is placed over the first layer by first soaking fibers with a second elastomer, winding the second elastomer-soaked fibers around the first layer, passing the newly wound core through a die to smooth the belt fibers into the shape of a belt, and then curing the second liquid elastomer. If flexible belts having more layers are desired the foregoing process can be repeated. The final cured belt is then removed from the core. Beneficially the different liquid elastomers and fabrics along with the windings are tailored to achieve desirable belt properties such as low surface energy, low friction, and different conformabilities.

BRIEF DESCRIPTION OF THE DRAWINGS

Other aspects of the present invention will become apparent as the following description proceeds and upon reference to the drawings, in which:

FIG. 6 illustrates a side view of a multiple layer flexible belt; and

FIG. 7 illustrates an alternative method of fabricating flexible belts.

DETAILED DESCRIPTION OF THE PREFERRED EMBODIMENTS

The pultrusion process has become a widely used, cost-effective method of manufacturing rigid fiber-reinforced composite materials. Pultrusion is usually performed by pulling fibers from a fiber creel (rack) through a thermoset resin contained in a bath such that the fibers become soaked with resin. The soaked fibers are then pulled through a heated die that cures the resin and the fibers to form a product that has the general form of the die. The cured product is then cut to a desired length. The fibers that are pulled through the resin bath may be individual fibers or part of a woven mat. The pultrusion process is well suited for the continuous production of products ranging from simple round bars to more complex panels.

In the prior art, pultrusion has been used almost exclusively with various thermosetting plastics to produce structurally rigid forms having high specific strength and stiffness. Common process variations involve producing deformations in the curing fibers or winding the fibers before final curing to introduce spatial properties. However, the principles of the present invention provide for a pultrusion process that is useful for producing flexible belts.

Figure 1:
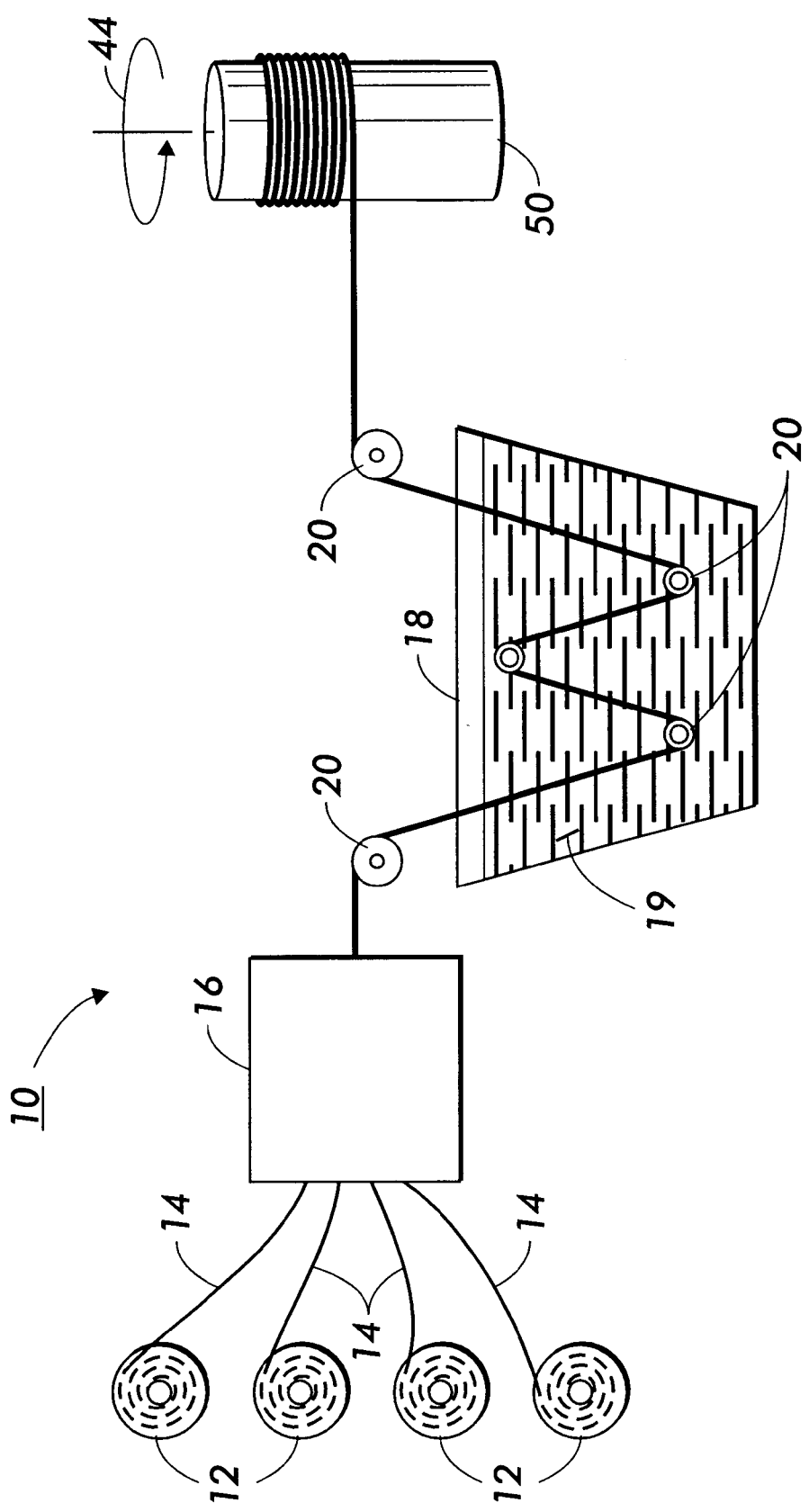
FIG. 1 schematically illustrates soaking fibers in a first elastomer and then winding the soaked fibers on a core.

FIG. 1 illustrates a pultrusion machine 10 that is useful for producing flexible belts. That machine includes a plurality of creels or spools 12 from which fibers 14 are drawn in a manner that is described subsequently. Those fibers are gathered together by a pre-die 16 that assists the fiber to move smoothly through the remainder of the pultrusion machine 10. As the fibers continue being pulled, they exit the pre-die and enter a pultrusion bath 18. The pultrusion bath 18 contains a liquid elastomer 19 that cures to form a flexible material. When in the pultrusion bath the fibers pass between pulleys 20 such that the fibers dwell in the pultrusion bath 18 long enough to become thoroughly soaked with the liquid elastomer. The uncured liquid elastomer coated fibers are then directionally wound around a mandrel 50 that turns in the direction 44 so as to pull the fibers 14 from the spools 12.

Figure 2:
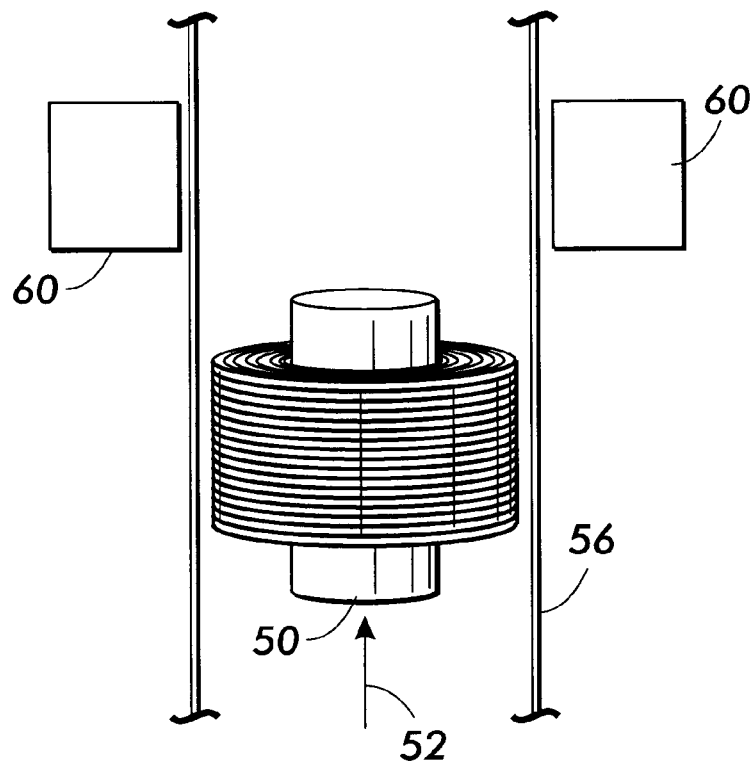
FIG. 2 illustrates passing the wound core through a die to smooth the elastomer-soaked fibers into the shape of a belt and then curing the smoothed elastomer-soaked fibers into a belt.
Figure 3:
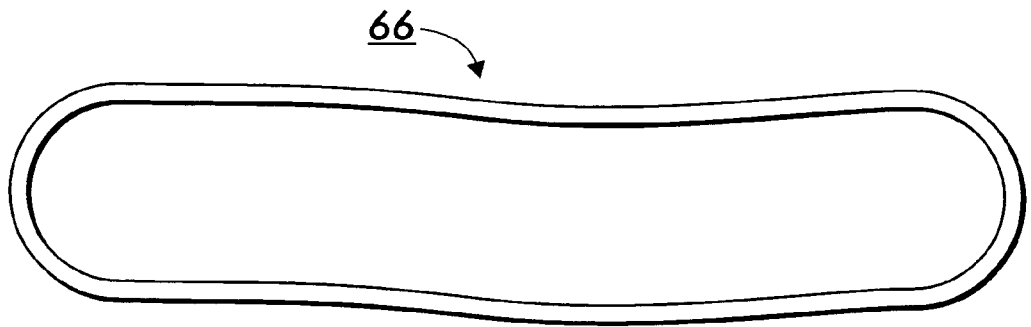
FIG. 3 illustrates a side view of a single layer flexible belt.

Turning now to FIG. 2, after a belt layer having a desired thickness is formed on the mandrel 50 the wound mandrel is passed in a direction 52 through a die 56. The die smoothes the elastomer-soaked fibers into the shape of a belt. The wound mandrel continues to advance in the direction 52 until it comes to a curing station 60. The curing station cures the liquid elastomer on the fibers, resulting in a fiber-reinforced elastomer material. The cured fiber-reinforced elastomer material is then removed from the core, resulting in a single layer flexible belt 66 shown in FIG. 3.

The curing station might take the form of an oven that heats the liquid elastomer so as to cause permanent cross-linking of the elastomer's macromolecules. Another curing station option is to use a chilling station that cools a thermoplastic liquid elastomer into a flexible elastomer.

Figure 4:
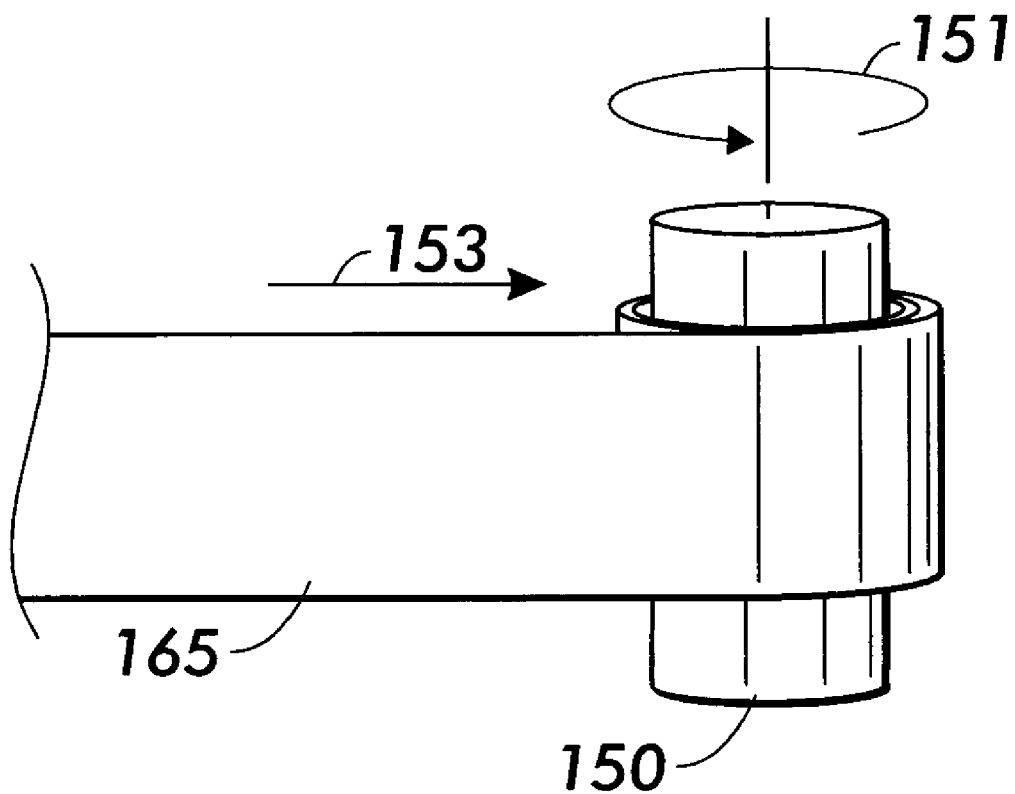
FIG. 4 illustrates an elastomer-soaked fiber webbing being wound on a mandrel.

While the foregoing has described one way of producing a single layer, fiber-reinforced flexible belt, other techniques can also be used. For example, it is possible to impregnate the fibers 14 with a liquid elastomer 19 by spraying, roll coating, or brushing. Furthermore, in some applications the curing station 60 may not be required since the liquid elastomer 19 might air-dry. Another modification is to use fibers 14 that are part of a woven fabric. Then instead of a fabric "thread" being wound as suggested by FIG. 1, a woven fabric is soaked in a liquid elastomer and wound around a core 50. This is illustrated in FIG. 4, wherein an elastomer soaked webbing 165 is wrapped around a mandrel 50 until a belt having a desired thickness is produced. That belt is then processed through a smoothing die and curing station as illustrated in FIG. 2.

Figure 5:
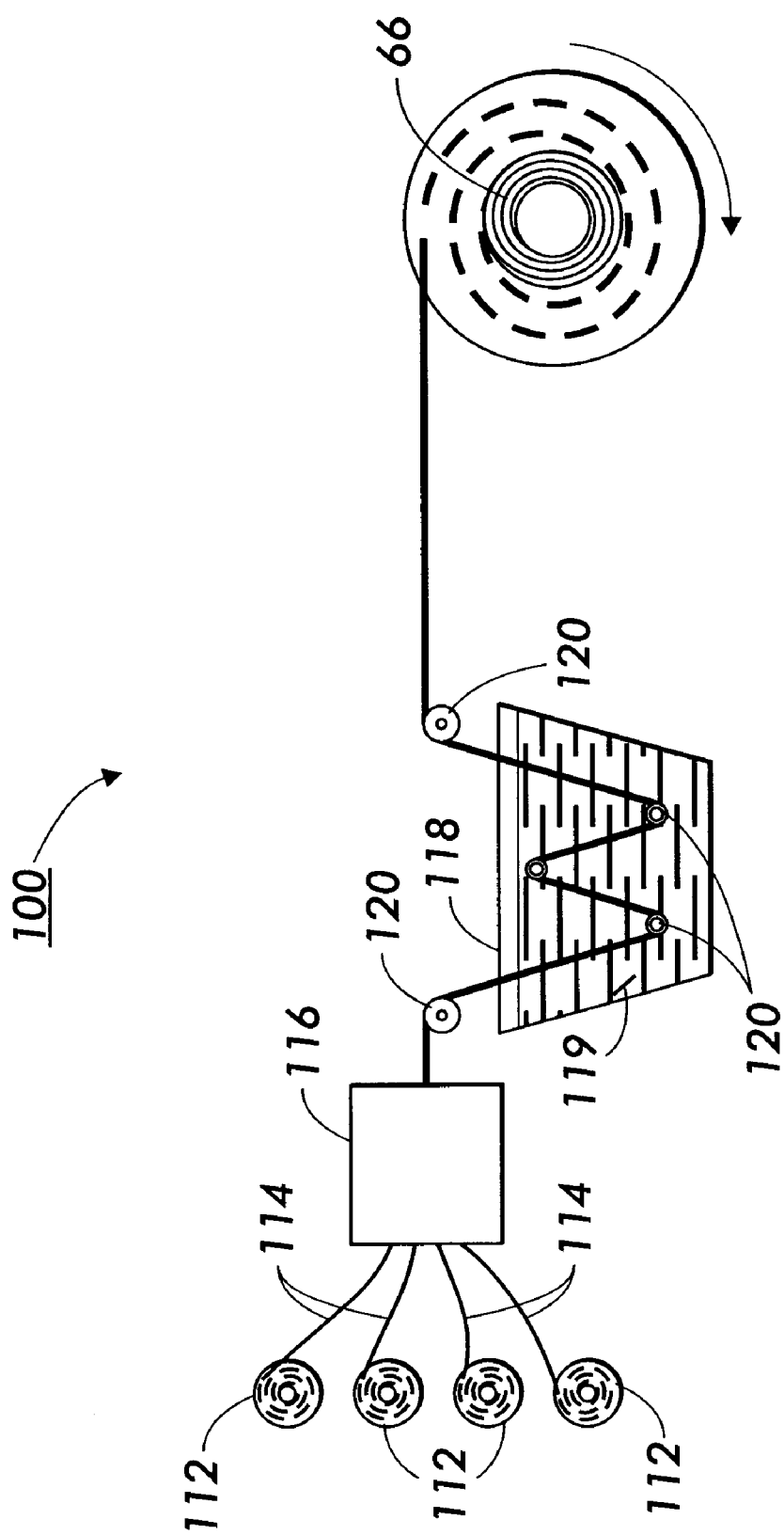
FIG. 5 schematically illustrates soaking fibers in a second elastomer and then winding the soaked fibers over a cured belt.

While the foregoing process is useful in producing flexible belts having a single layer, flexible belts having multiple layers that impart different belt properties are highly desirable. Such belts are readily fabricated using the principles of the present invention. FIG. 5 illustrates a pultrusion machine 100 that is useful in producing flexible belts having multiple layers. The pultrusion machine 100 includes a plurality of creels or spools 112 from which fibers 114 are drawn. As with the machine 10, those fibers may be individual fibers or a woven mat. In either case the fibers are gathered together by a pre-die 116. As the fibers continue being pulled, they exit the pre-die and enter a second pultrusion bath 118 that contains a second liquid elastomer 119 that cures to form a second flexible material. When in the second pultrusion bath the fibers pass between pulleys 120 such that the fibers dwell in the second pultrusion bath 118 until they are thoroughly soaked with the second liquid elastomer 119. When the second liquid elastomer soaked fibers are pulled from the second pultrusion bath they are wound around a mandrel 50 and over a first belt layer 66 that was previously formed, but not removed form the mandrel. As the mandrel turns the fibers 114 are pulled from the spools 112.

After a second belt layer having a desired thickness is formed on the mandrel/first layer the wound mandrel is passed through a smoothing and forming die and a curing station as illustrated generally in FIG. 2. When the cured belt is removed from the mandrel a flexible belt 200 as illustrated in FIG. 6 results. That flexible belt has two layers of fiber-reinforced elastomers, one layer 66 that was coated with a liquid elastomer 19 and a second layer 204 that was coated with a second liquid elastomer 119. The layers join at a seam 206.

By using the modified pultrusion process described above it is possible to produce belts having engineered properties. For example, if a lightweight, durable belt is desired an aromatic polyamide, such as Kevlar™, might comprise the fibers 14 or 114. To impart high conformability, a liquid fluoroelastomer of vinylidene fluoride and hexafluropropylene, such as Viton™, possibly containing additives to improve its electrical properties can be used to coat the aromatic polyamide fiber. Both Kevlar™ and Viton™ are available from E. I. Dupont. If the belt is used as a transfer belt, in which case good toner release properties are desired, the fibers that form the outer surface of the belt could be coated with a silicon polymer. Other useful materials include the urethanes. Of course, other combinations of fibers and liquid elastomers can be used to implement other desired properties. Additionally, the weave patterns of webbings made from the cured fibers can be controlled so as to introduce desirable belt properties. For example, by weaving fibers at acute angles with the circumference can produce elastic layers having preferred directions of elasticity.

FIG. 7 illustrates another method of fabricating a flexible belt according to the principles of the present invention. That method uses multiple creels, the creels 302 and 304. The creel 302 holds a fiber 306 while the creel 304 holds a fiber 308. In addition, multiple creels that are not shown hold fibers 310 and 312. Those fibers are placed on a mandrel 314. As shown, the fibers 310 are placed along the axis of the mandrel to form a lower layer, the fibers 306 are wound around the fibers 310 to form a second layer, the fibers 308 are wound over the fibers 310 and 306 to form a third layer, and the fibers 312 are placed along the axis of the mandrel over the fibers 310, 306, and 308 to form a fourth layer. The fibers are then pulled through a die 316 (see below). The die 316 includes feed tube 317 that feeds elastomer under pressure to the fibers such that the fibers become soaked with elastomer as they advance through the die. The die 316 also shapes and finishes the fibers and cures the elastomer to form a flexible tube 318. As the tube is pulled, the fibers 310 and 312 (which run axially) are pulled from their creels. The resulting tube 318 is then cut, for example with a laser, to form flexible belts.

The foregoing method helps illuminate the flexibility of the pultrusion process in forming flexible belts. There may be many more creels, layers, and fibers. Different layers can be formed using different combinations of fibers, which may be helically wound. The tube 318 need not itself be a finished product. A tube 318 might pass through more pultrusion stations to receive additional fiber layers, possibly being coated with different elastomers.

It is to be understood that while the figures and the above description illustrate the present invention, they are exemplary only. Others who are skilled in the applicable arts will recognize numerous modifications and adaptations of the illustrated embodiment that will remain within the principles of the present invention. Therefore, the present invention is to be limited only by the appended claims.

What is claimed:

1. A method of fabricating a flexible belt comprising the steps of
   (a) pulling a first fiber from a creel;
   (b) passing said pulled first fiber through a first liquid elastomer such that the first fiber becomes soaked with the first liquid elastomer;
   (c) wrapping the soaked first fibers around a mandrel to form a belt;
   (d) curing the soaked first fibers to produce a belt;
   (e) removing the belt from the form.

2. The method of fabricating a flexible belt according to claim 1, further including the steps of:
   (f) pulling a second fiber from a creel;
   (g) passing said second fiber through a second liquid elastomer such that the second fiber becomes soaked with the second liquid elastomer;
   (h) wrapping the soaked second fibers around the mandrel and the cured first fibers; and
   (i) curing the soaked second fibers.

3. The method according to claim 1, wherein said first liquid elastomer is a liquid fluoroelastomer of vinylidene fluoride and hexafluropropylene.

4. The method according to claim 1, wherein said first liquid elastomer is a silicone polymer.

5. The method according to claim 1, wherein said first liquid elastomer is a urethane.

6. The method according to claim 1, wherein said fiber is an aromatic polyamide fiber.

7. The method according to claim 6, wherein said first liquid elastomer is a liquid fluoroelastomer of vinylidene fluoride and hexafluropropylene.

* * * * *